US009678692B2

United States Patent
Iwase

(10) Patent No.: US 9,678,692 B2
(45) Date of Patent: Jun. 13, 2017

(54) IMAGE FORMING APPARATUS REMOTE CONTROL SYSTEM, IMAGE FORMING APPARATUS, AND REMOTE CONTROL METHOD WITH A CONTROL UNIT THAT DISPLAYS WARNING SCREENS

(71) Applicant: KONICA MINOLTA, INC., Chiyoda-ku, Tokyo (JP)

(72) Inventor: Tomohiro Iwase, Fuchu (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/837,209

(22) Filed: Aug. 27, 2015

(65) Prior Publication Data

US 2016/0070510 A1 Mar. 10, 2016

(30) Foreign Application Priority Data

Sep. 5, 2014 (JP) .................................. 2014-181227

(51) Int. Cl.
*G06F 3/12* (2006.01)
*G06F 3/14* (2006.01)

(52) U.S. Cl.
CPC ............ *G06F 3/1222* (2013.01); *G06F 3/121* (2013.01); *G06F 3/1238* (2013.01); *G06F 3/1256* (2013.01); *G06F 3/1286* (2013.01); *G06F 3/1454* (2013.01)

(58) Field of Classification Search
None
See application file for complete search history.

(56) References Cited

U.S. PATENT DOCUMENTS

2006/0290680 A1* 12/2006 Tanaka ............... H04N 1/00204
345/173
2014/0268225 A1* 9/2014 Shibukawa ........ H04N 1/00204
358/1.15

FOREIGN PATENT DOCUMENTS

JP 2007-043647 A 2/2007
JP 2009-253651 A 10/2009

OTHER PUBLICATIONS

Office Action (Notice of Reasons for Rejection) dated Oct. 5, 2016 issued by the Japanese Patent Office in corresponding Japanese Patent Application No. 2014-181227, and English language translation of Office Action (12 pages).

* cited by examiner

*Primary Examiner* — Andrew H Lam
(74) *Attorney, Agent, or Firm* — Buchanan Ingersoll & Rooney PC

(57) ABSTRACT

An image forming apparatus remote control system in which an information terminal device and an image forming apparatus are connected with each other via a network, the system capable of displaying an operation screen on a terminal operation unit of the information terminal device via the network based on operation unit image data corresponding to an operation screen displayed on an apparatus operation unit of the image forming apparatus, and capable of operating the apparatus operation unit of the image forming apparatus by remote control on the terminal operation unit side, the system includes a control unit that controls the remote control, wherein the control unit displays warning screens each including a display cancel function on the operation screens when a use action of the remote control system and a use action of the apparatus operation unit overlap with each other.

16 Claims, 8 Drawing Sheets

IMAGE FORMING APPARATUS REMOTE CONTROL SYSTEM, IMAGE FORMING APPARATUS, AND REMOTE CONTROL METHOD WITH A CONTROL UNIT THAT DISPLAYS WARNING SCREENS

The entire disclosure of Japanese Patent Application No. 2014-181227 filed on Sep. 5, 2014 including description, claims, drawings, and abstract are incorporated herein by reference in its entirety.

BACKGROUND OF THE INVENTION

Field of the Invention

The present invention relates to remote control of an image forming apparatus, under which control an operation screen is displayed on a terminal operation unit of a terminal device based on an operation screen displayed on an apparatus operation unit of the image forming apparatus. The apparatus operation unit of the image forming apparatus is operated by operation of the terminal operation unit.

Description of the Related Art

A remote panel function is known as a function for realizing remote control of an image forming apparatus connected via a network. This remote panel function is provided not only for remote control, but also for a monitoring function on the remote control side to monitor contents of operation executed on the apparatus operation unit side. It is therefore preferable that an identical screen is displayed on both the apparatus side and the remote control side. Particularly, in case of a remote panel function realized by utilizing an existing technology called VNC (Virtual Network Computing (registered trademark)), information transmitted from the apparatus operation unit side includes only screen information. In this case, as a matter of course, an identical screen is displayed on both the sides.

During use of the remote control, display of the contents of operation executed under the remote control maybe prohibited on the apparatus operation unit side by adopting a certain method capable of prohibiting display of the screen of the apparatus operation unit. In this case, however, the current machinery state is not recognizable on the apparatus operation unit side. On the other hand, when the remote panel is connected with the apparatus operation unit under operation, the contents of operation on the operation unit side are visible to the remote control side. In this case, problems may arise in view of security.

For example, JP 2009-253651 A describes a method for preventing leakage of confidential information by displaying a different dummy image on a pre-view screen or the like of job data including the confidential information, instead of displaying a part of an image including the confidential information, during remote control or direct control of an operation panel.

In addition, JP 2007-43647 A describes a method for maintaining security by displaying a different image such as a warning screen on the remote control side, at the time of display of a screen requiring security such as a service screen under remote control.

According to JP 2009-253651 A, leakage of confidential information is prevented at the time of display of the screen including the confidential information. However, other information such as operation procedures and screen switching procedures may be leaked to the outside.

According to JP 2007-43647 A, panel locking is realized by displaying an image on the remote control side different from an image on the apparatus operation unit side. However, in case of a remote panel utilizing VNC which only displays an identical image on both the operation unit side and the remote control side, this known art is not applicable.

SUMMARY OF THE INVENTION

The present invention has been developed in light of the aforementioned circumstances, and an object thereof is to provide a technology capable of clarifying a machinery state on both sides of an apparatus operation unit and a terminal operation unit by displaying a warning on each operation screen at the time of overlap between a use action of a remote control system and a use action of the apparatus operation unit.

To achieve the abovementioned object, according to an aspect, an image forming apparatus remote control system reflecting one aspect of the present invention is a system in which an information terminal device and an image forming apparatus are connected with each other via a network, the system capable of displaying an operation screen on a terminal operation unit of the information terminal device via the network based on operation unit image data corresponding to an operation screen displayed on an apparatus operation unit of the image forming apparatus, and capable of operating the apparatus operation unit of the image forming apparatus by remote control on the terminal operation unit side, the system comprising a control unit that controls the remote control, wherein the control unit displays warning screens each including a display cancel function on the operation screens when a use action of the remote control system and a use action of the apparatus operation unit overlap with each other.

According to the image forming apparatus remote control system of Item. 2, in Item. 1, the control unit preferably displays the warning screens when the apparatus operation unit is operated during use of the remote control system.

According to the image forming apparatus remote control system of Item. 3, in Item. 2, the control unit preferably displays the warning screens only while operation using the apparatus operation unit is limited.

According to the image forming apparatus remote control system of Item. 4, in Item. 2 or 3, the control unit preferably turns off the apparatus operation unit when specific operation is input to the terminal operation unit during use of the remote control system.

According to the image forming apparatus remote control system of Item. 5, in Item. 3 or 4, the control unit preferably prohibits reception of operation including touch panel operation, hard key operation, mouse operation, and keyboard operation input via the apparatus operation unit for limiting operation input from the apparatus operation unit.

According to the image forming apparatus remote control system of Item. 6, in Item. 1, the control unit preferably displays the warning screens when the remote control system is connected during use of the apparatus operation unit.

According to the image forming apparatus remote control system of Item. 7, in Item. 6, a state of use of the apparatus operation unit is preferably such a state that a fixed period has not elapsed from input of certain operation to the apparatus operation unit.

According to the image forming apparatus remote control system of Item. 8, in Item. 6 or 7, the control unit preferably disconnects the remote control system at the time of cancel of display of the warning screens.

According to the image forming apparatus remote control system of Item. 9, in any one of Items. 1 to 8, the control unit preferably displays the warning screens for a fixed period during display of the warning screens, and cancels display of the warning screens after an elapse of the fixed period to return to the original display screens.

According to the image forming apparatus remote control system of Item. 10, in any one of Items. 1 to 9, the control unit is preferably capable of canceling display of the warning screens based on operation by a user.

To achieve the abovementioned object, according to an aspect, an image forming apparatus reflecting one aspect of the present invention is an apparatus included in an image forming apparatus remote control system in which an information terminal device and the image forming apparatus are connected with each other via a network, the system capable of displaying an operation screen on a terminal operation unit of the information terminal device via the network based on operation unit image data corresponding to an operation screen displayed on an apparatus operation unit of the image forming apparatus, and capable of operating the apparatus operation unit of the image forming apparatus by remote control on the terminal operation unit side, the image forming apparatus comprising a control unit that controls the remote control, wherein the control unit displays warning screens each including a display cancel function on the operation screens when a use action of the remote control system and a use action of the apparatus operation unit overlap with each other.

According to the image forming apparatus of Item. 12, in Item. 11, the control unit preferably determines that the overlap is present when the apparatus operation unit is operated during use of the remote control system.

According to the image forming apparatus of Item. 13, in Item. 11, the control unit preferably determines that the overlap is present at the time of reception of a request of connection with the remote control system during use of the apparatus operation unit.

To achieve the abovementioned object, according to an aspect, an information forming apparatus remote control method reflecting one aspect of the present invention is a remote control method in which an information terminal device and an image forming apparatus are connected with each other via a network, the method capable of displaying an operation screen on a terminal operation unit of the information terminal device via the network based on operation unit image data corresponding to an operation screen displayed on an apparatus operation unit of the image forming apparatus, and capable of operating the apparatus operation unit of the image forming apparatus by control on the terminal operation unit side, the method comprising: a step of determining whether or not an use action of the remote control system and a use action of the apparatus operation unit overlap with each other; and a step of displaying warning screens each including a display cancel function on the operation screens when the determining step determines that the overlap is present.

According to the image forming apparatus remote control method of Item. 15, in Item. 14, the determination step preferably determines that the overlap is present when the apparatus operation unit is operated during use of the remote control system.

According to the image forming apparatus remote control method of Item. 16, in Item. 14, the determination step preferably determines that the overlap is present when the remote control system is connected during operation of the apparatus operation unit.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of an image forming apparatus and an image forming apparatus remote control system of the present invention will be described with reference to the drawings. However, the scope of the invention is not limited to the illustrated examples.

Figure 1:
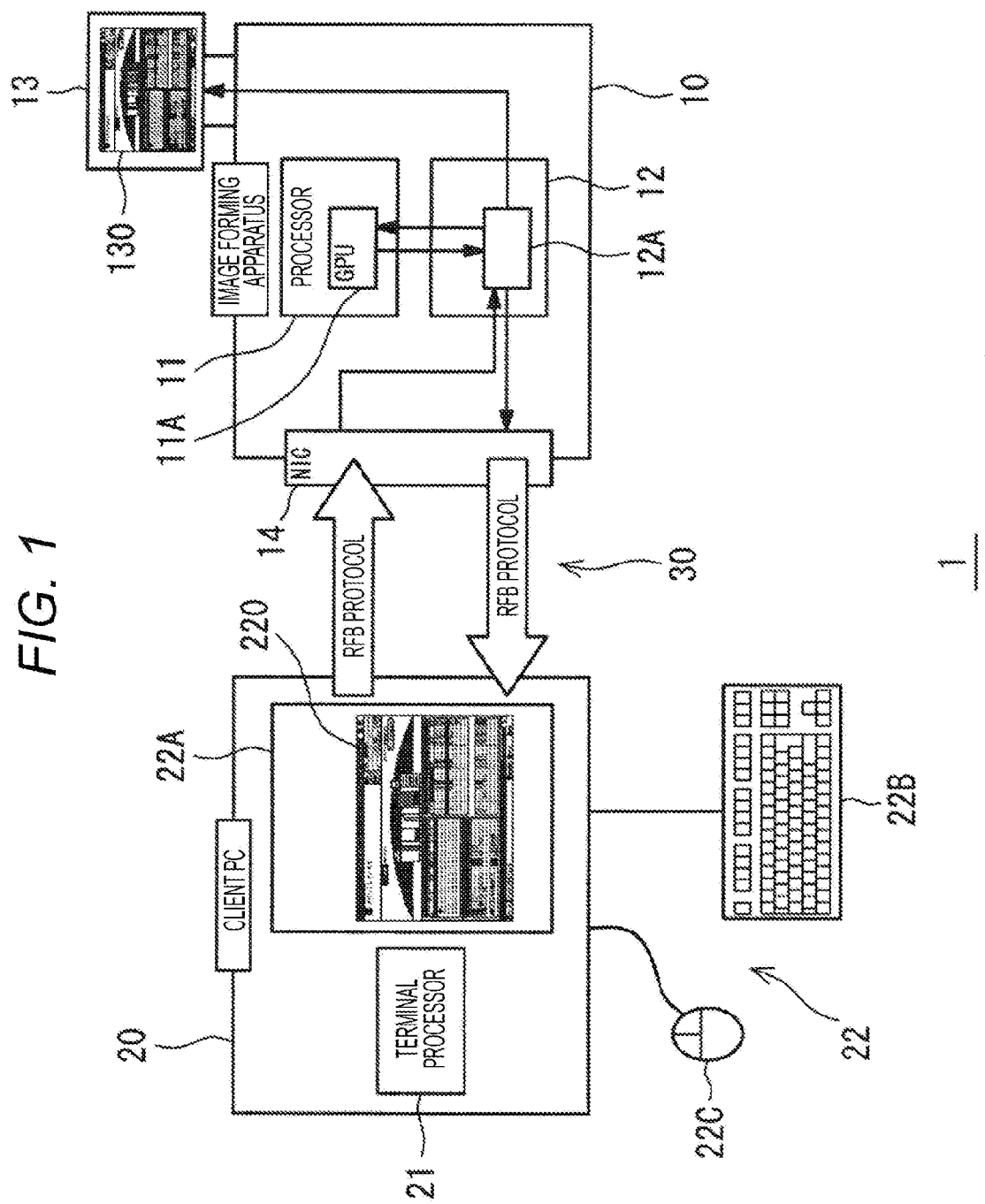
FIG. 1 is a view illustrating an outline of an image forming apparatus and an image forming apparatus remote control system according to an embodiment of the present invention.

FIG. 1 is a view illustrating an outline of an image forming apparatus remote control system 1. In this system, an image forming apparatus 10 and a client PC 20 are connected with each other via a LAN 30 as illustrated in the figure.

The client PC 20 corresponds to an information terminal device according to the present invention, while the LAN 30 corresponds to a network according to the present invention.

The image forming apparatus 10 includes a processor 11 for controlling the entire operation of the image forming apparatus 10. The image forming apparatus 10 further includes an apparatus operation unit 13 disposed on the body of the image forming apparatus 10. The apparatus operation unit 13 is constituted by an LCD (Liquid Crystal Display) including a touch panel. The apparatus operation unit 13 is controlled by the processor 11.

The processor 11 includes a CPU, a program under which the CPU operates, a storage unit and others. The processor 11 further includes a GPU 11A. The GPU 11A is a graphic processing unit which processes image data on an operation screen of the apparatus operation unit 13, and on an operation screen of the image forming apparatus remote control system 1. In displaying a screen in an enabled state on the apparatus operation unit 13, an operation screen image is initially formed by the GPU 11A based on operation screen data stored in the storage unit. Then, an operation screen corresponding to the operation screen image is drawn on the apparatus operation unit 13 under the control of the processor 11. The processor 11 further includes software operating for realizing remote control. The processor 11 operating under this software functions as a remote control server using RFB protocol to control the remote control client side.

The image forming apparatus 10 includes a controller chip 12 which performs interruption, bus control and other processes. The controller chip 12 includes a remote management processor 12A which executes management control associated with remote processing in response to an instruction from the processor 11. The GPU 11A is connected with the remote management processor 12A so that operation screen data can be transmitted and received between the remote management processor 12A and the GPU 11A. The apparatus operation unit 13 is connected with the remote management processor 12A so that operation screen data can be transmitted from the remote management processor 12A to the apparatus operation unit 13 for display of the operation screen.

The processor 11 and the controller chip 12 noted above function as a control unit according to the present invention, which controls the image forming apparatus 10 and manages remote control.

The image forming apparatus 10 includes an NIC 14 (Network Interface) connected with the remote management processor 12A. The NIC 14 is connectable with a network. According to this example, the LAN 30 as a network is connected with the NIC 14.

The client PC 20 is connected with the LAN 30 via a not-shown NIC or others. The client PC 20 includes a terminal operation unit 22 which includes a display unit 22A, a keyboard 22B, and a mouse 22C.

The client PC 20 includes a terminal processor 21 which controls the entire operation of the client PC 20. The terminal processor 21 includes a CPU, a program under which the CPU operates, a storage unit and others.

The client PC 20 includes software operating for realizing remote control. The client PC 20 operating under this software operates as a remote control client using RFB protocol. During a remote control action, the operation screen displayed on the apparatus operation unit 13 is displayed on the display unit 22A. An operation screen 220 displayed on the display unit 22A is formed based on operation unit image data associated with an operation screen 130 displayed on the apparatus operation unit 13. The operation screen 220 may be a screen identical to the operation screen 130, or may be modified in the mode of display and displayed on the display unit 22A as a modified screen. For example, a change in the writing direction (horizontal or vertical), a change in the arrangement of display area blocks, scaling of a part of a display area, and other changes may be made.

Actions of the image forming apparatus 10 and the image forming apparatus remote control system 1 are hereinafter described.

According to the image forming apparatus 10, the GPU 11A forms an operation unit image based on operation unit image data under the control of the processor 11 in accordance with an operation state of the image forming apparatus 10, and transmits the operation unit image thus formed to the apparatus operation unit 13 to display the operation screen 130.

On the other hand, for realizing remote control by the client PC 20, the remote control client of the client PC 20 is actuated to issue an instruction to the image forming apparatus 10 for instructing connection with the remote control server via the LAN 30. When this connection is acceptable, the image forming apparatus 10 allows operation of the remote control server in the processor 11. In this case, the GPU 11A forms a remote control unit image based on the operation unit image data. The remote management processor 12A transmits the remote control unit image thus formed to the client PC 20 via the NIC 14 and the LAN 30.

The client PC 20 receives the remote control unit image, and displays the operation screen 220 on the display unit 22A by the function of the terminal processor 21. The operation screen 220 for remote control may be either a screen identical to the operation screen 130 on the apparatus operation unit 13, or a screen including a change in the mode of display. The operation screen 220 is operable on the client PC 20 side by using the keyboard 22B and the mouse 22C. The operation screen 220 may include a touch panel operable by touch panel operation.

When operation is input by using the keyboard 22B and the mouse 22C on the client PC 20 side, the terminal processor 21 transmits the contents of this operation to the image forming apparatus 10 via the LAN 30 in accordance with RFB protocol. The contents of the RFB protocol are transmitted to the remote management processor 12A via the NIC 14. The remote management processor 12A transmits the contents of the operation to the GPU 11A, in which condition a necessary action on the image forming apparatus side is performed by the processor 11 in accordance with the contents of the operation. When a change of the operation screen is needed in accordance with the contents of operation, an image changed from the operation unit image is generated by the GPU 11A. Thereafter, the operation screen of the apparatus operation unit 13 is rewritten by the remote management processor 12A based on the changed image.

The remote management processor 12A further transmits operation unit image data changed by the remote control to the client PC 20 via the NIC 14 and the LAN 30 using RFB protocol. The terminal processor 21 rewrites the operation screen 220 on the display unit 22A based on the transmitted operation unit image. The operation unit image thus transmitted may be either an image showing the entire operation unit, or an image showing only a necessary area of the operation unit image.

When the apparatus operation unit 13 is operated in the enabled state of the apparatus operation unit 13, the processor 11 performs a necessary action in accordance with the operation, and rewrites the operation unit image when necessary. When rewriting of the operation screen is needed, the remote management processor 12A instructs the GPU 11A to generate operation unit image data associated with a change of the remote control operation screen. The remote management processor 12A receives an operation unit image thus changed, and transmits the changed operation unit image to the client PC 20 via the NIC 14 and the LAN 30 using RFB protocol. The terminal processor 21 of the client PC 20 receives the changed operation unit image, and changes the operation screen on the display unit 22A.

These procedures allow linked operation and display between the apparatus operation unit 13 and the terminal operation unit 22 under the state of remote control.

A conventional remote panel is realized by communication between the client PC and the image processing apparatus using HTTP (Hypertext Transfer Protocol). However, the volume of data increases when image data is exchange by communication of HTTP, in which condition a response from the remote control side is considerably delayed in comparison with a response from the apparatus panel side.

According to this embodiment, therefore, software called VNC using RFB protocol is used, for example, to propose a remote panel system excellent in response and real-time performance as illustrated in FIG. 1.

RFB protocol achieves remote control while presenting a view of identical screen information both on the client side (referred to as terminal operation unit) and the remote controlled side (referred to as apparatus operation unit) via a network, by transmission of input information input by a mouse or a keyboard from the remote control side to the apparatus unit side to transmit image data from the apparatus operation unit side to the terminal operation unit side.

In addition, RFB protocol transmits only difference information included in image data transmitted from the apparatus operation unit. In this case, screen information to be captured includes only a smaller volume of data than that of data transmitted in the conventional method, wherefore the response and real-time performance can improve.

According to this embodiment, a remote panel having a function substantially equivalent to the function of the conventional remote panel is realized. Accordingly, substantially real-time screen display and operation are achievable in synchronization with the apparatus operation panel.

On the other hand, according to the method as in this embodiment which transmits image information on the apparatus operation unit side to the remote control side as it is, an image different from the image on the apparatus operation unit side is difficult to display on the remote control side.

For example, there is a function of panel locking for preventing operation on either one of the apparatus operation unit side and the remote control side during operation on the other side. Generally, the locked side comes into the disabled state during panel locking, in which condition the locked state is displayed on the screen.

As noted above, an identical screen is displayed both on the apparatus operation unit side and the remote control side in case of the remote panel. Accordingly, the locked state is also displayed on the unlocked side, in which condition inconvenience may be caused on the unlocked side.

According to the present invention, however, the type of the remote panel is not specifically limited, but may be a type communicating by HTTP or others.

Figure 3:
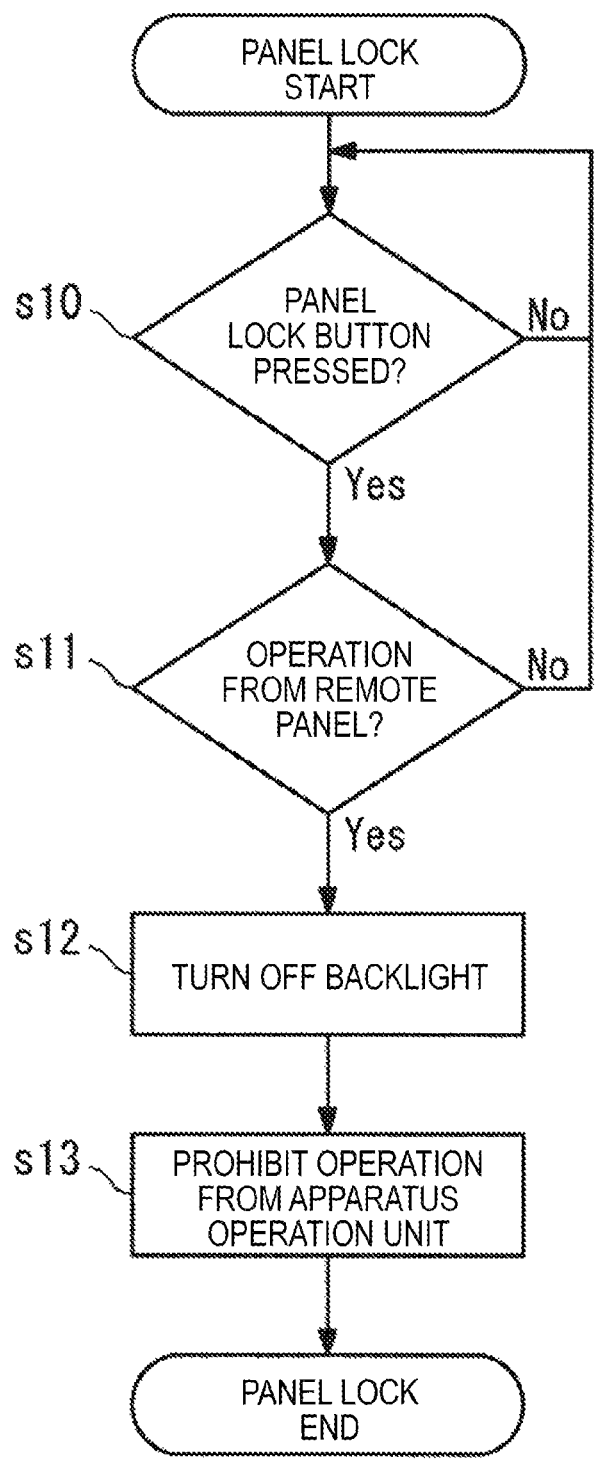
FIG. 3 is a flowchart showing procedures performed during panel locking in the image forming apparatus remote control system.
Figure 4:
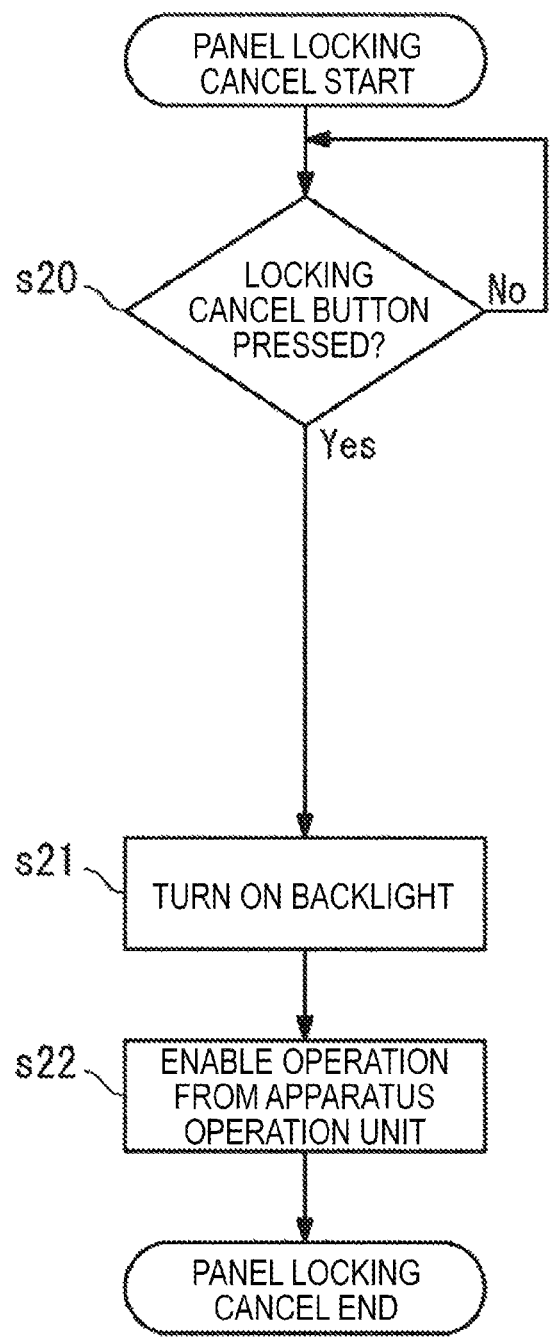
FIG. 4 is a flowchart showing procedures at the time of panel locking cancel in the image forming apparatus remote control system.

Units for locking operation on the operation screen is hereinafter described with reference to FIGS. 2 through 4.

Under the condition that a panel backlight is turned off on the apparatus operation unit side, only the apparatus operation unit side is in a non-display state, while checking and operation of the screen on the remote control side are allowed in the normal condition. During panel locking, only operation from the remote control side is receivable, while operation from the apparatus operation unit side is prohibited for preventing erroneous operation given from the apparatus operation unit.

More specifically, each of the operation screens has an operation function for canceling the setting of locking. According to an example illustrated in FIG. 2, a soft/hard key screen 131 is displayed on the operation screen 130 of the apparatus operation unit 13, while a soft/hard key screen 221 is displayed on the operation screen 220 of the terminal operation unit 22, both screens 131 and 221 shown as pop-up display. Each of the soft/hard key screens 131 and 221 is displayed when a black area in the lower part of the operation screen is operated. When the soft/hard key screen is displayed on one of the operation screens, the soft/hard key screen is also displayed on the other operation screen under remote control.

According to an example of the soft/hard key screen 221, a lock button 222 is displayed on this screen in the enabled state. Every time the lock button 222 is pressed, the state is switched between panel locking and locking cancel.

Figure 2:
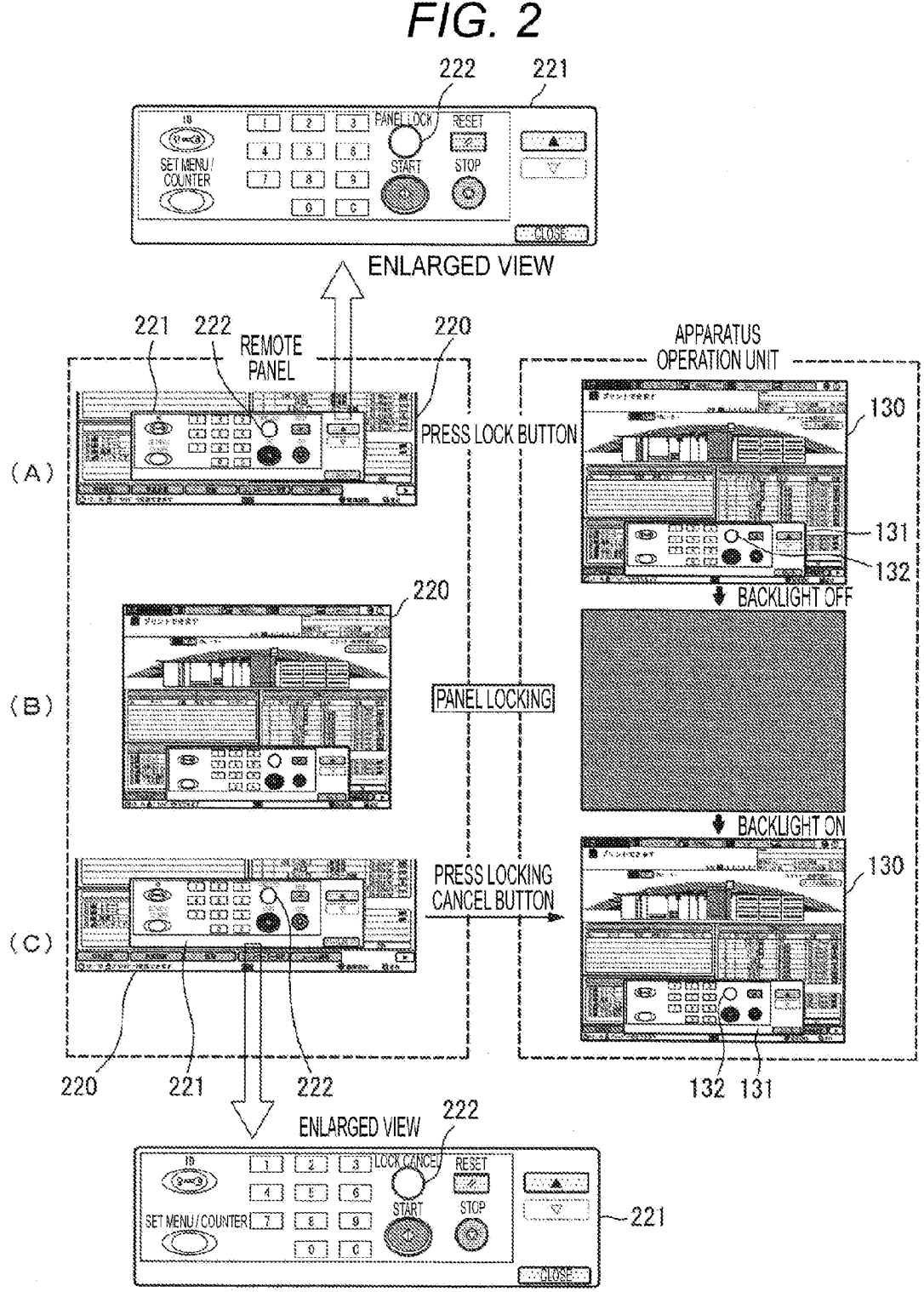
FIG. 2 is a view illustrating an operation screen of an apparatus operation unit and an operation screen of a terminal operation unit during a panel locking action in the image forming apparatus remote control system.

When the lock button 222 is operated in a state illustrated in (A) in FIG. 2 on the operation screen 220 side, the contents of operation are transmitted to the image forming apparatus 10. In this case, the apparatus operation unit 13 is locked, in which condition the backlight of the apparatus operation unit 13 is turned off as illustrated in (B) FIG. 2. As a result, operation of the apparatus operation unit 13 becomes disabled. When the lock button 222 is operated on the operation screen 220 during locking, locking is canceled. In this case, the contents of operation are transmitted to the image forming apparatus 10, in which condition the backlight of the apparatus operation unit 13 is turned on. As a result, operation of the apparatus operation unit 13 becomes enabled.

According to this embodiment, checking of the operation screen is allowed only on the remote control side under the locking function effective state. Accordingly, leakage of not only a part of the screen, but also all operation including a series of operation procedures is avoidable.

Procedures of the foregoing locking operation are hereinafter described with reference to a flowchart shown in FIG. 3. The following procedures are executed under the control of the processor 11.

It is determined whether or not the lock button has been pressed at a panel lock start (step s10). When it is determined that the lock button has not been pressed (step s10: No), the flow waits until the lock button is pressed.

When it is determined that the lock button has been pressed (step s10: Yes), it is further determined whether or not the operation has been input from the remote panel, i.e., the terminal operation unit 22 (step s11). When it is determined that the operation has not been input from the remote panel (step s11: No), the flow returns to step s10 and determines whether or not the lock button has been pressed.

When it is determined that the operation has been input from the remote panel (i.e., operation of the lock button 222) (step s11: Yes), the backlight of the apparatus operation unit 13 is turned off (step s12) to prevent execution of operation input from the apparatus operation unit 13 (step s13). The procedures of panel locking are now ended.

Procedures for canceling of panel locking are hereinafter described with reference to a flowchart shown in FIG. 4. The following procedures are executed under the control of the processor 11.

It is determined whether or not the locking cancel button has been pressed in the panel locking state (step s20). When it is determined that the locking cancel button has not been pressed (step s20: No), the flow waits until the locking cancel button is pressed.

When it is determined the locking cancel button (i.e., lock button 132 or lock button 222) has been pressed (step s20: Yes), the backlight of the apparatus operation unit 13 is turned on (step s21) to enable operation input from the apparatus operation unit 13 (step s22). The procedures of panel locking cancel are now ended.

In this mode, however, the screen is completely unrecognizable on the apparatus operation unit side, wherefore an erroneous determination may be made such that the apparatus has come into a sleep state.

When operation is input from the remote control side to the touch panel or the hard key on the apparatus operation unit during panel locking in the off-state of the backlight, the backlight may be turned on with display of a warning screen notifying that the current state is the remote control state. This display allows the operation unit side to recognize the current state of panel locking.

In this case, however, the same screen is displayed on the remote control side during display of the warning screen, in which condition operation of the remote control side is not allowed. Accordingly, it is preferable that the warning screen is displayed only for a fixed period, and switched to the original screen with the backlight turned off after an elapse of the fixed period. In this case, the operation limit on the remote control side along with display of the warning screen decreases to the minimum requirement, wherefore the screen returns to the original state where only the remote control side is enabled in the condition of panel locking, without requiring an user to perform any additional operation.

Switching of the operation screens when the apparatus operation unit 13 is operated in the remote control effective state under panel locking are hereinafter described with reference to FIG. 5.

Figure 5:
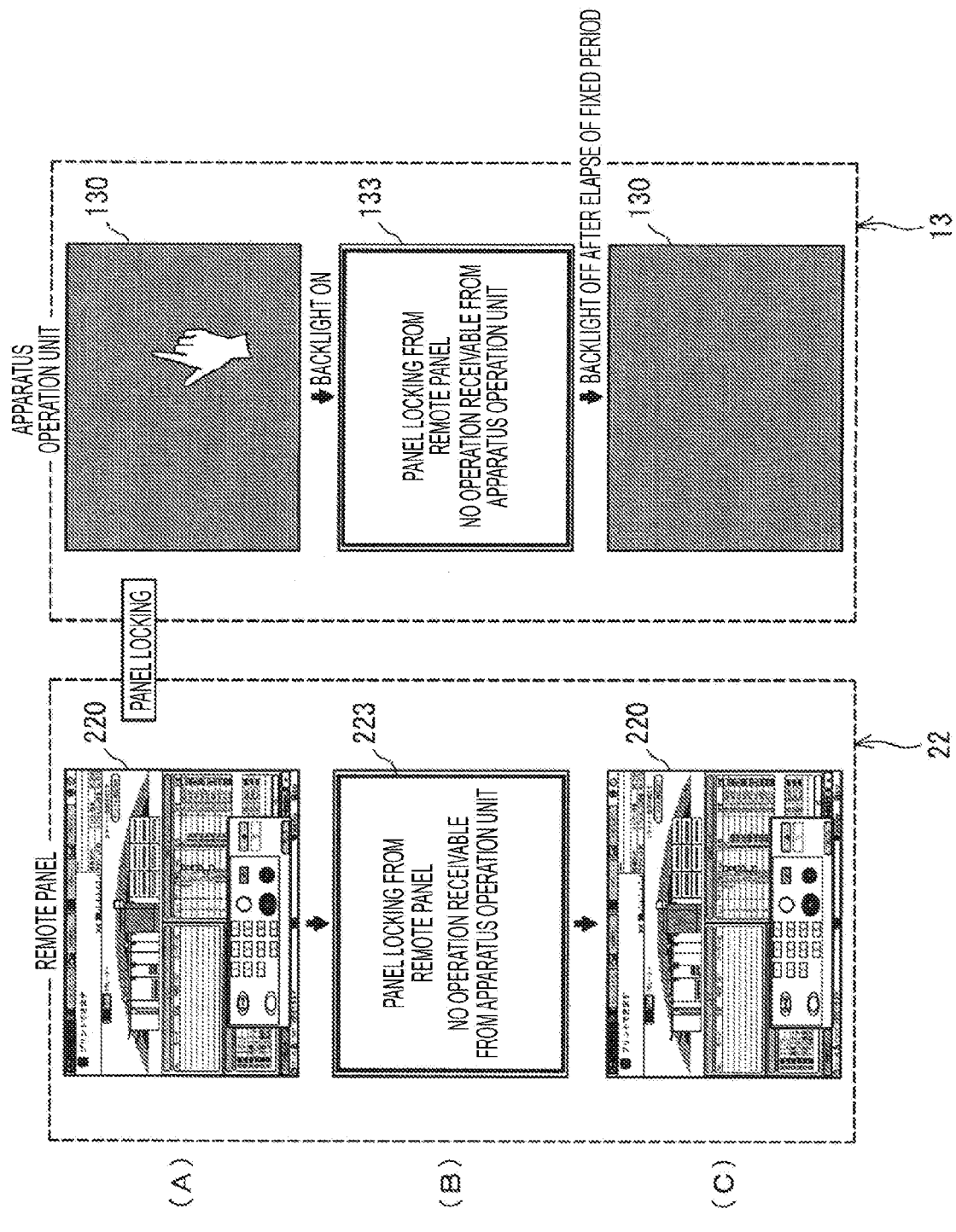
FIG. 5 is a view illustrating an operation screen of the apparatus operation unit and an operation screen of the terminal operation unit when the apparatus operation unit is operated during panel locking in the image forming apparatus remote control system.

During panel locking, the backlight of the apparatus operation unit 13 is turned off as illustrated in (A) in FIG. 5, in which condition operation of the operation screen is disabled on the apparatus operation unit side. In this state, the apparatus operation unit 13 does not perform predetermined operation even when receiving operation via the touch panel or the hard key. However, a touch given to the panel at this time is detectable by the apparatus operation unit 13. The processor 11 recognizes this touch operation as operation input to the apparatus operation unit 13 in the remote control state, and turns on the backlight of the apparatus operation unit 13 with display of a warning screen 133 on the apparatus operation unit 13. It is displayed on the warning screen 133 that the remote panel (i.e., terminal operation unit 22) is currently in the panel locking state, and does not receive operation through the apparatus operation unit 13. The contents of the warning are not limited to particular contents, but may be varied in accordance with circumstances.

As illustrated in (B) in FIG. 5, the remote management processor 12A transmits warning screen data to the client PC 20 in accordance with the display on the warning screen 133 on the apparatus operation unit 13 side. The client PC 20 displays a warning screen 223 on the display unit 22A in accordance with the warning screen data.

After displaying the warning screen 133 on the apparatus operation unit 13 for a fixed period, the processor 11 deletes the warning screen, and turns off the backlight of the apparatus operation unit 13. On the other hand, the client PC 20 deletes the warning screen 223 in accordance with deletion of the warning screen 133, and displays the operation screen 220 in the enabled state.

According to this embodiment, display of the warning screens is canceled after the elapse of the fixed period of display. However, a cancel button or the like capable of canceling display may be provided on each of the warning screens in such a condition that operation of the cancel button is only allowed. In this case, the warning is cancelable on either the apparatus operation unit side or the terminal operation side.

According to this embodiment, panel locking is realized by the turned-off state of the backlight of the apparatus operation unit, in which condition operation is input to the operation unit under locking. In this case, display of the warning screen is limited for a fixed period, and the backlight is again turned off after the elapse of the fixed period so that the disabled period of the remote control side becomes the minimum. Accordingly, actions performed in this embodiment are obviously different from the corresponding actions in the related art.

Figure 6:
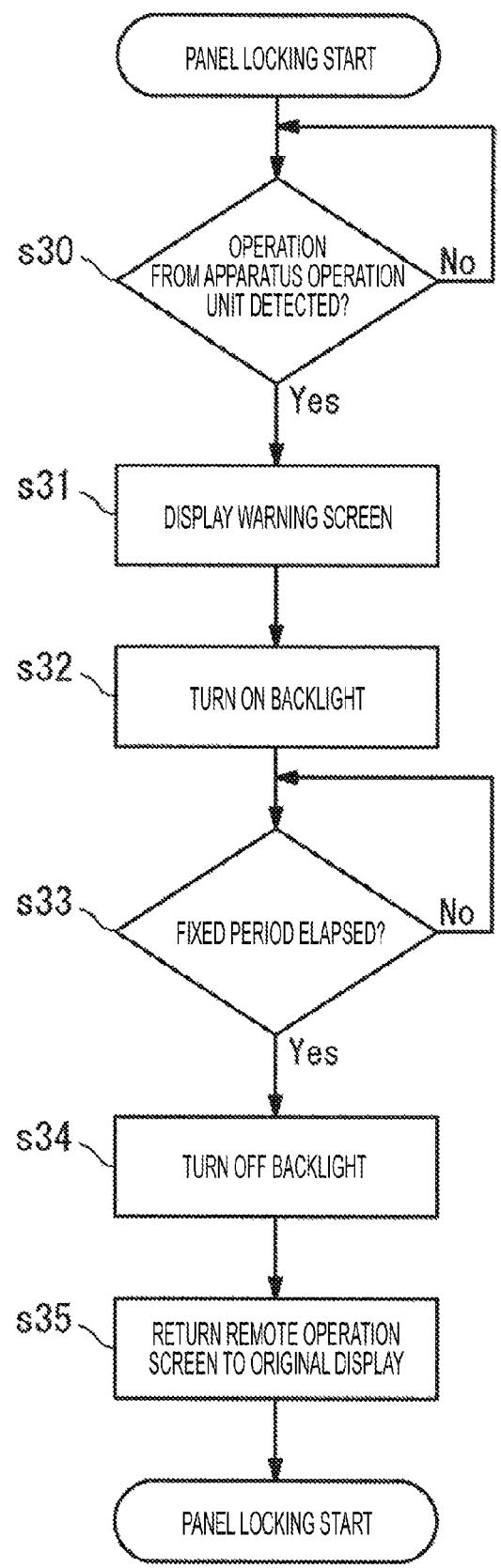
FIG. 6 is a view illustrating procedures for controlling display of the operation screen of the apparatus operation unit when the apparatus operation unit is operated during panel locking in the image forming apparatus remote control system.

Procedures associated with display of the warning screen are hereinafter described with reference to a flowchart shown in FIG. 6. The following procedures are executed under the control of the processor 11.

It is detected whether or not operation has been input from the apparatus operation unit 13 in the remote control effective state during panel locking (step s30). When it is determined that no operation has been input to the apparatus operation unit 13 (step s30: No), the flow waits until operation is input.

When it is determined that operation has been input from the apparatus operation unit 13 (step s30: Yes), the warning screens are displayed on the respective operation screens (step s31) with the backlight of the apparatus operation unit 13 turned on (step s32). The warning screens are displayed on both the apparatus operation unit 13 and the display unit 22A.

After the warning screens are displayed, it is determined whether or not a fixed period has elapsed from the display (step s33). A reference for the fixed period is stored in a non-volatile manner in the storage unit of the processor 11, for example. Before the elapse of the fixed period (step s33: No), the flow wait until the elapse of the fixed period. After the elapse of the fixed period (step s33: Yes), the backlight of the apparatus operation unit 13 is turned off (step s34). The warning screens of the apparatus operation unit 13 and the display unit 22A are deleted along with turning off of the backlight. Then, the remote control screen (i.e., operation screen 220) is returned to the original display (step s35), in which condition the state of the panel locking start is maintained.

According to the image forming apparatus and the remote control system for realizing display corresponding to identical operation unit image data both on the apparatus operation unit 13 and on the remote control side as discussed herein, the remote control side executes panel locking to prohibit display of the contents of operation on the apparatus operation unit side. When operation is performed on the apparatus operation unit side during locking, a warning screen is displayed for a short period to notify the apparatus operation unit side about the state of panel locking.

The respective modes discussed herein are provided to execute an action for preventing leakage of the contents of operation to the apparatus operation unit side during operation on the remote control side, and to notify the user of the apparatus operation unit about the current state of remote control operation when the user operates the operation unit during this action.

On the other hand, when the remote control side makes remote panel connection during operation on the apparatus operation unit side, the contents of operation of the apparatus operation unit may be leaked to the remote control side.

For overcoming this problem, a warning screen for notification about the current state of use on the apparatus operation unit side is displayed on each of the operation screens at the time of connection from the remote control side during use of the apparatus operation unit. After the warning screen is displayed for a fixed period, remote control connection is disconnected.

This method notifies the remote control side about the remote control prohibition state during the current state of use of the apparatus operation unit, while avoiding leakage of the contents of operation on the apparatus operation unit side to the remote control side.

Figure 7:
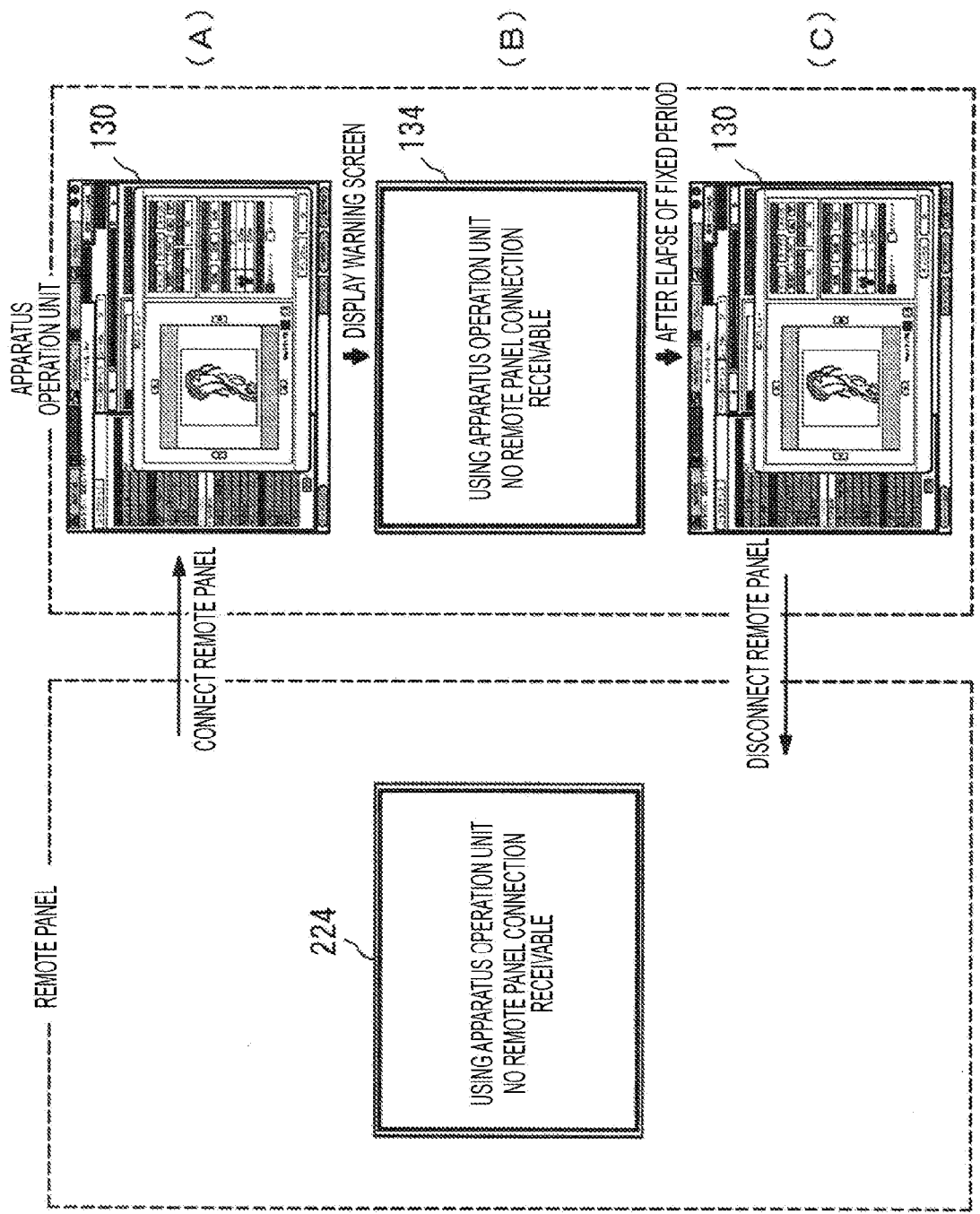
FIG. 7 is a view illustrating an operation screen of the apparatus operation unit and an operation screen of the terminal operation unit at the time of issue of a request for remote panel connection during use of the apparatus operation unit in the image forming apparatus remote control system.

FIG. 7 illustrates state switching of operation screens for notifying remote control prohibition.

When a request for remote panel connection is issued from the PC client 20 during operation on the apparatus operation unit 13 side as illustrated in (A) in FIG. 7, a warning screen 134 is displayed on the operation screen 130 of the apparatus operation unit 13 as illustrated in (B) in FIG. 7, showing that the current state is the use state of the apparatus operation unit 13, and that remote panel connection is not receivable. In addition, a similar warning screen 224 is displayed on the display unit 22A on the client PC 20 side by the function of remote management. After an elapse of a fixed period of display of the warning screens 134 and 224, the warning screens 134 and 224 are deleted. Thereafter, the display of the apparatus operation unit 13 is returned to the original display, in which condition remote panel connection is disconnected. According to the present invention, remote panel connection may be maintained in the connectable state without disconnection. The operation state of the apparatus operation unit 13 may include a fixed period from the end of the operation state of the apparatus operation unit 13, as well as the period within the operation state. A reference of the fixed period may be stored in a non-volatile manner in the storage unit of the processor 11, for example.

Figure 8:
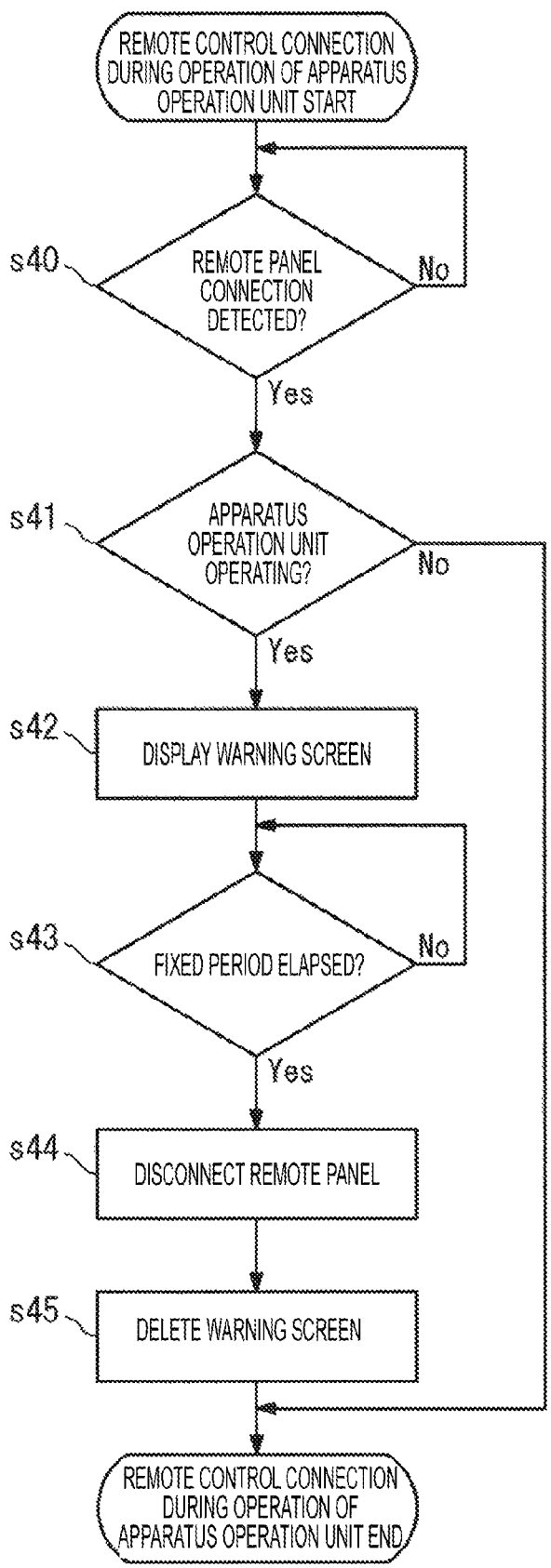
FIG. 8 is a flowchart showing procedures for controlling display of the operation screen of the apparatus operation unit and the operation screen of the terminal operation unit at the time of issue of a request for remote panel connection during use of the apparatus operation unit in the image forming apparatus remote control system.

Procedures for displaying the warning screens 134 and 224 are hereinafter described with reference to a flowchart shown in FIG. 8. The following procedures are executed under the control of the processor 11.

According to a process executed at the time of remote control connection during operation of the apparatus operation unit 13, it is detected whether or not remote panel connection has been made (step s40). When it is determined that remote panel connection has not been made (step s40: No), the flow waits for this connection.

When it is detected that remote panel connection has been made (step s40: Yes), it is determined whether or not the current state of the apparatus operation unit 13 is the operation state (step s41). When it is determined that the current state of the apparatus operation unit 13 is not the operation state, the process ends. Whether or not the state of the apparatus operation unit 13 is the operation state is determined based on an elapsed time of a fixed period from operation of the apparatus operation unit 13, as well as the actual detection of the current operation state of the apparatus operation unit 13 as discussed herein.

When the current state of the apparatus operation unit 13 is the operation state (step s41: Yes), the warning screen 134 and the warning screen 224 are displayed on the apparatus operation unit 13 and the display unit 22A, respectively, in place of the operation screen 130 and the operation screen 220 (step s42). After display of the warning screens, it is determined whether or not a fixed period has elapsed (step s43). When it is determined that the fixed period has not elapsed (step s43: No), the flow waits for the elapse of the period. A reference of the fixed period may be stored in non-volatile manner in the storage unit of the processor 11, for example.

When it is determined that the fixed period has elapsed from the start of display of the warning screens (step s43: Yes), the remote panel is disconnected from the image forming apparatus 10 side (step s44). Thereafter, the warning screens 134 and 224 are deleted to return the operation screen 130 of the apparatus operation unit 13 to the original display (step s45) and end the process.

Accordingly, when connection is made from the remote control side during operation on the apparatus operation unit side, leakage of the contents of operation on the operation unit side is prevented based on display of the warning screens.

Modifications and changes may be made to the specific embodiment of the present invention described herein in appropriate manners without departing from the scope of the present invention.

According to an embodiment of the present invention described above, warnings are displayed on the operation screens to allow a user to clearly recognize the machinery state when the use action of the remote control system and the use action of the apparatus operation unit overlap with each other.

For example, operation on the apparatus operation unit side is disabled when the apparatus operation unit is operated during use of the remote control system. In this case, checking of the operation screen is allowed only on the remote control side, in which condition leakage of all the operation including a series of operation procedures is avoidable. In addition, the user easily recognizes the machinery state based on the warnings displayed at this time.

Moreover, when connection of the remote control system is intended during use of the apparatus operation unit, for example, this connection of the remote control system is disconnected after display of the warning screens so as to prevent operation on the terminal operation side. Accordingly, the degree of security increases.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An image forming apparatus remote control system in which an information terminal device and an image forming apparatus are connected with each other via a network, the system capable of displaying an operation screen on a terminal operation unit of the information terminal device via the network based on operation unit image data corresponding to an operation screen displayed on an apparatus operation unit of the image forming apparatus, and capable of operating the apparatus operation unit of the image forming apparatus by remote control on the terminal operation unit side, the system comprising a control unit that controls the remote control, wherein the control unit displays warning screens each including a display cancel function on the operation screens when a use action of the remote control system and a use action of the apparatus operation unit overlap with each other, and wherein when the display cancel function of each of the warning screens is operated by a user, the warning screens are no longer displayed on the operation screens, and the terminal operation unit remains on while the apparatus operation unit is turned off.

2. The image forming apparatus remote control system according to claim 1, wherein the control unit displays the warning screens when the apparatus operation unit is operated during use of the remote control system.

3. The image forming apparatus remote control system according to claim 2, wherein the control unit displays the warning screens only while operation using the apparatus operation unit is limited.

4. The image forming apparatus remote control system according to claim 2, wherein the control unit turns off the apparatus operation unit when specific operation is input to the terminal operation unit during use of the remote control system.

5. The image forming apparatus remote control system according to claim 3, wherein the control unit prohibits reception of operation including touch panel operation, hard key operation, mouse operation, and keyboard operation input via the apparatus operation unit for limiting operation input from the apparatus operation unit.

6. The image forming apparatus remote control system according to claim 1, wherein the control unit displays the warning screens when the remote control system is connected during use of the apparatus operation unit.

7. The image forming apparatus remote control system according to claim 6, wherein a state of use of the apparatus operation unit is such a state that a fixed period has not elapsed from input of certain operation to the apparatus operation unit.

8. The image forming apparatus remote control system according to claim 6, wherein the control unit disconnects the remote control system at the time of cancel of display of the warning screens.

9. The image forming apparatus remote control system according to claim 1, wherein the control unit displays the warning screens for a fixed period during display of the warning screens, and cancels display of the warning screens after an elapse of the fixed period to return to the original display screens.

10. The image forming apparatus remote control system according to claim 1, wherein the control unit is capable of canceling display of the warning screens based on operation by a user.

11. An image forming apparatus included in an image forming apparatus remote control system in which an information terminal device and the image forming apparatus are connected with each other via a network, the system capable of displaying an operation screen on a terminal operation unit of the information terminal device via the network based on operation unit image data corresponding to an operation screen displayed on an apparatus operation unit of the image forming apparatus, and capable of operating the apparatus operation unit of the image forming apparatus by remote control on the terminal operation unit side, the image forming apparatus comprising a control unit that controls the remote control,
wherein the control unit displays warning screens each including a display cancel function on the operation screens when a use action of the remote control system and a use action of the apparatus operation unit overlap with each other, and
wherein when the display cancel function of each of the warning screens is operated by a user, the warning screens are no longer displayed on the operation screens, and the terminal operation unit remains on while the apparatus operation unit is turned off.

12. The image forming apparatus according to claim 11, wherein the control unit determines that the overlap is present when the apparatus operation unit is operated during use of the remote control system.

13. The image forming apparatus according to claim 11, wherein the control unit determines that the overlap is present at the time of reception of a request of connection with the remote control system during use of the apparatus operation unit.

14. An information forming apparatus remote control method in which an information terminal device and an image forming apparatus are connected with each other via a network, the method capable of displaying an operation screen on a terminal operation unit of the information terminal device via the network based on operation unit image data corresponding to an operation screen displayed on an apparatus operation unit of the image forming apparatus, and capable of operating the apparatus operation unit of the image forming apparatus by control on the terminal operation unit side, the method comprising:
a step of determining whether or not an use action of the remote control system and a use action of the apparatus operation unit overlap with each other; and
a step of displaying warning screens each including a display cancel function on the operation screens when the determining step determines that the overlap is present, wherein when the display cancel function of each of the warning screens is operated by a user, the warning screens are no longer displayed on the operation screens, and the terminal operation unit remains on while the apparatus operation unit is turned off.

15. The image forming apparatus remote control method according to claim 14, wherein the determination step determines that the overlap is present when the apparatus operation unit is operated during use of the remote control system.

16. The image forming apparatus remote control method according to claim 14, wherein the determination step determines that the overlap is present when the remote control system is connected during operation of the apparatus operation unit.

* * * * *